United States Patent
Fox et al.

(10) Patent No.: US 6,762,914 B2
(45) Date of Patent: Jul. 13, 2004

(54) METHOD FOR THE RAPID MEASUREMENT OF MAGNETORESISTIVE READ HEAD DIMENSIONS

(75) Inventors: Ciaran A. Fox, San Jose, CA (US); Peter John Melz, Hollister, CA (US); Jih-Shiuan Luo, San Jose, CA (US); Joseph F. Smyth, Aptos, CA (US); Chin-Yu Yeh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 10/125,212

(22) Filed: Apr. 17, 2002

(65) Prior Publication Data

US 2003/0197854 A1 Oct. 23, 2003

(51) Int. Cl.[7] .............................. G11B 5/39; G01R 33/12
(52) U.S. Cl. ...................... 360/313; 324/210; 324/212; 29/603.09
(58) Field of Search ................................ 360/313, 316; 324/210, 212; 29/603.09, 603.1

(56) References Cited

U.S. PATENT DOCUMENTS

| 5,790,334 A | 8/1998 | Cunningham ................. 360/66 |
| 6,515,475 B2 * | 2/2003 | Goubau et al. ............. 324/210 |
| 6,581,271 B2 * | 6/2003 | Sasaki et al. ............. 29/603.09 |
| 6,642,713 B2 * | 11/2003 | Diederich ................... 324/210 |

FOREIGN PATENT DOCUMENTS

JP          2001-6129          *  1/2001

* cited by examiner

Primary Examiner—David Ometz
(74) Attorney, Agent, or Firm—Ervin F. Johnston (57) ABSTRACT

An automated production process for the screening of the read-width (RW) and/or the stripe-height (SH) for every magnetoresistive (MR) read sensor element in a wafer substrate. The method of this invention uses the RW and/or SH values found with optical examination by electron microscopy of several of the MR sensor elements to estimate two substrate coefficients that relates the optical RW and SH measurements to heating-delta measurements, $\delta=(RH-RC)/RC$, where RH is the sensor resistance when hot and RC is the sensor resistance when cold, both of which can be measured using automated equipment. These relationships are sufficiently similar among all MR sensor elements manufactured on a single wafer substrate during a single manufacturing procedure that, when the hot resistance RH is measured at a constant applied voltage, the heating-delta, may be used with a first substrate coefficient to estimate the read-width RW of each MR sensor element for quality-control purposes during manufacture. When the hot resistance RH is measured at a constant applied current, the heating-delta may be used with a second substrate coefficient to estimate the stripe-height SH of each MR sensor element for quality-control purposes during manufacture.

24 Claims, 7 Drawing Sheets

METHOD FOR THE RAPID MEASUREMENT OF MAGNETORESISTIVE READ HEAD DIMENSIONS

BACKGROUND OF THE INVENTION

1. Field of the Invention

This invention relates generally to magnetoresistive (MR) read head sensing elements for magnetic data recording devices and, more particularly, to a rapid MR read head width measurement technique suitable for use during manufacture of data recording head assemblies.

2. Description of the Related Art

Computer system secondary data storage is commonly provided in the form of a direct access storage device (DASD), such as a hard disk drive, a tape drive subsystem, or the like. A typical hard disk drive unit includes one or more rotating storage disks on which digital data is stored magnetically in a plurality of concentric tracks. Small read/write heads are positioned close to the rotating disk surface and moved from track to track to transfer data between the computer system and the spinning storage disk. Similarly, a typical tape drive unit includes a flexible magnetic tape on which data is stored magnetically in a plurality of parallel tracks. The tape is streamed over a small interleaved read/write head array to transfer data between the computer system and the tracks of the streaming tape. DASD read/write heads are usually manufactured by depositing various thin-films on a substrate to form an array of read head magneto-resistive (MR) sensor elements interleaved with write head magnetic gap elements. This substrate is then sliced and the pieces polished and mounted to produce read/write heads having the desired number of interleaved read and write elements for use in hard disk drives, tape drives, or the like.

Figure 5:
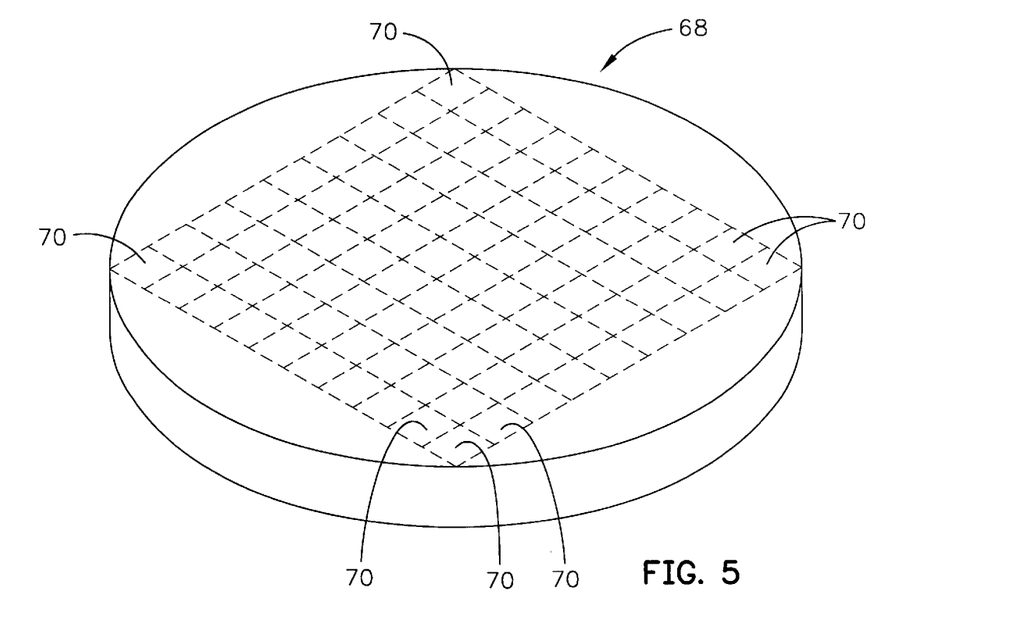
FIG. 5 illustrates a single wafer substrate showing a plurality of interleaved read/write head elements fabricated thereon.

An MR head includes a center portion denominated the MR stripe, which is the element that senses changes in magnetic field representing data stored on a magnetic disk or tape surface in a DASD. MR read head sensors are well-known in the art and are particularly useful as read elements for high data recording densities. The MR read sensor provides a higher output signal than an inductive read head, which results in a higher signal-to-noise ratio for the playback channel, thereby permitting the reading of a higher areal density of recorded data on the magnetic disk surface. Such high data recording densities are possible because the MR sensor typically is very small (a 1 $\mu$m long stripe face with a read-width of 10 nm or less is typical). Because of the small sizes involved, modern MR read sensor fabrication is accomplished using monolithic thin film photolithographic fabrication technology. FIG. 5 illustrates a typical thin film wafer substrate on which an interleaved array of MR read sensor elements and magnetic gap elements have been fabricated. In the present art, 16,000 or more such interleaved read/write head pairs are fabricated on a single wafer substrate during one fabrication procedure.

The sensitivity of an MR head depends on many factors. One of the most significant factors is the bias current provided to the MR head. The ability to read a signal from the storage media is, in part, a function of the amount of bias current supplied to the MR head. Signal sensitivity can be increased by increasing the amount of bias current supplied to the MR head. Therefore, increased bias current generally produces an improved signal-to-noise ratio and reduces bit error rates. However, simply increasing the bias current is not a complete solution because excessive current can significantly shorten the useful life span of the MR read head.

Bias current can adversely affect MR read head life in two different ways. First, application of bias current in excessive quantities can cause the MR sensor element to overheat. If the current density reaches a high enough level, the MR element can burn out. This type of catastrophic failure is typically avoided by selecting a MR element bias current that avoids burnout over the entire operating temperature range.

Catastrophic failure, however, is not the most common cause of MR read head failure. The most common cause of MR read head failure is a phenomenon known as electromigration and/or interlayer diffusion. Constant exposure to even normal operating levels of bias current will, over time, change the molecular structure of the MR sensor element, thereby degrading the magnetic sensing capability of the MR read head.

During manufacture, the MR read heads are typically characterized to determine the range of their operating characteristics over temperature and bias current variations. The performance of MR heads fabricated on a given fabrication line may vary considerably because of process variations in the important geometric features on the heads, such as read-width (RW) and stripe height (SH). Proper Quality Control (QC) procedures must assure that even the MR read head with the worst-case geometric tolerances can provide a minimum desired lifetime. One option is for the designer to select a MR stripe bias current that holds the stripe temperature below a predetermined threshold, thereby providing the desired minimum lifetime for the DASD unit but at the expense of reducing MR sensor performance by producing all production heads for operation with the bias current selected for the worst-case element geometry.

MR heads with sensor elements that fall within a nominal range of manufacturing tolerances may be driven with higher bias currents to boost their performance without exceeding the relevant temperature thresholds, but such higher bias current can shorten the life expectancy of the MR heads at the edge of expected manufacturing variations. Because an MR head should be operated below 155 degrees Celsius to avoid premature failure, the maximum bias current for all heads is typically set to equal the maximum bias current for the worst-case head.

Because of the tradeoff between performance, bias current and element life expectancy, MR sensor element performance depends critically on the geometry of the MR stripe. Two important MR stripe dimensions are the read-width (RW) and the stripe height (SH), as they are known in the art. The MR read-width (RW) has an important effect on DASD performance because it directly affects the minimum available track width and, therefore, the maximum areal storage density for the DASD. Normally, in the art, the RW for a MR sensor can be measured only during production by using electron microscopy to visually inspect the physical MR element. Such a technique is unacceptably slow and burdensome for quality-control (QC) inspection in a MR element production line capable of fabricating 16,000 or more elements per wafer substrate. As a result of this problem, the usual production QC practice is to select a few exemplary MR elements from each wafer substrate for inspection by electron microscopy. This means that 99% or more of the MR read head elements are not properly inspected for acceptable RW value, requiring the bias current design compromises discussed above to accommodate expected geometric variations.

There is accordingly a clearly-felt need in the art for a reasonably efficient technique for testing all MR sensor elements for proper stripe geometry during production. The related unresolved problems and deficiencies are clearly felt in the art and are solved by this invention in the manner described below.

SUMMARY OF THE INVENTION

This invention solves the problem described above by providing for the first time a method for the automated production screening of the read-width (RW) and/or the stripe-height (SH) for every magnetoresistive (MR) read sensor element in a wafer substrate. The method of this invention uses the RW and/or SH values (optical SH measurements require the cross-sectioning of the sensor for measuring) found by optical examination with electron microscopy of several of the MR sensor elements to estimate two substrate coefficients that relates the optical RW and SH measurements to heating-delta measurements, $\delta=(RH-RC)/RC$, where RH is the RC is the sensor resistance when cold, both of which can be measured using automated equipment These relationships are sufficiently similar among all MR sensor elements manufactured on a single wafer substrate during a single manufacturing procedure that, when the hot resistance RH is measured at a constant applied voltage, the heating-delta, may be used with a first substrate coefficient to estimate the read-width RW of each MR sensor element for quality-control purposes during manufacture. When the hot resistance RH is measured at a constant applied current, the heating-delta may be used with a second substrate coefficient to estimate the stripe-height SH of each MR sensor element for quality-control purposes during manufacture.

It is a purpose of this invention to use such a substrate coefficient to estimate the read-width RW from a first heating-delta measured for any MR read sensor element on the same substrate. When the hot resistance RH is measured at a constant applied voltage, the resulting heating-delta, which can be measured using automated equipment, may be used with a first substrate coefficient to estimate the read-width RW of each MR sensor element for quality-control purposes during manufacture.

It is an advantage of this invention that the read-width RW for every MR sensor element can be estimated from the optical measurement of RW for a few of the MR sensor elements and the automated measurement of a cold resistance and a constant-voltage hot resistance for all MR sensor elements on the substrate wafer.

It is another purpose of this invention to use another substrate coefficient to estimate the throat height SH from a second heating-delta measured for any MR read sensor element on the same substrate. When the hot resistance RH is measured at a constant applied current, the resulting heating-delta, which can be measured using automated equipment, may be used to estimate the stripe-height SH of each MR sensor element for quality-control purposes during manufacture.

It is another advantage of this invention that the throat height SH for every MR sensor elements can be estimated from the optical measurement of SH for a few of the MR sensor elements and the automated measurement of a cold resistance and a constant-current hot resistance for all MR sensor elements on the substrate wafer.

In one embodiment, this invention is a method for determining the read-width $RW_i$ of one of a first plurality (I) of magnetoresistive (MR) sensor elements fabricated on a substrate, including the steps of optically measuring the read-width $RW_k$ of each of a second plurality (K<I) of the MR sensor elements, where $i \neq k=1, K$, measuring a heating-delta $\delta_i$ for the one MR sensor element and a heating-delta $\delta_k$ for each of the second plurality (K<I) of MR sensor elements and calculating the read-width $RW_i$ of the one MR sensor element as a function of the optical read-width measurements $RW_k$ and the heating-delta measurements $\delta_i$ and $\delta_k$.

In another embodiment, this invention is a method for determining the stripe-height $SH_i$ of one of a first plurality (I) of magnetoresistive (MR) sensor elements fabricated on a substrate, including the steps of optically measuring the stripe-height $SH_k$ of each of a second plurality (K<I) of the MR sensor elements, where $i \neq k=1, K$, measuring a heating-delta $\delta_i$ for the one MR sensor element and a heating-delta $\delta_k$ for each of the second plurality (K<I) of MR sensor elements, and calculating the stripe-height $SH_i$ of the one MR sensor element as a function of the optical stripe-height measurements $SH_k$ and the heating-delta measurements $\delta_i$ and $\delta_k$.

In yet another embodiment, this invention is a process for manufacturing magnetoresistive (MR) heads having a read-width $RW_j$ within a predetermined range ($RW_{max}$, $RW_{min}$) including the steps of fabricating a first plurality (I) of magnetoresistive (MR) sensor elements on a substrate, optically measuring the read-width $RW_k$ of each of a second plurality (K<I) of the MR sensor elements, where k=1, K, measuring a heating-delta $\delta_i$ for each of the first plurality (I) of MR sensor elements, calculating an upper heating-delta limit $\delta_{max}$ and a lower heating-delta limit $\delta_{min}$ for the MR sensor elements as a function of the optical read-width measurements $RW_k$ and the heating-delta measurements $\delta_k$, and selecting those MR sensor elements for which the heating-delta $\delta_j$ is within the range ($\delta_{max}$, $\delta_{min}$) for use in making the magnetoresistive (MR) heads.

In still another embodiment, this invention is a process for manufacturing magnetoresistive (MR) heads having a stripe-height $SH_j$ within a predetermined range ($SH_{max}$, $SH_{min}$) including the steps of fabricating a first plurality (I) of magnetoresistive (MR) sensor elements on a substrate, optically measuring the stripe-height $SH_k$ of each of a second plurality (K<I) of the MR sensor elements, where k=1, K, measuring a heating-delta $\delta_i$ for each of the first plurality (I) of MR sensor elements, calculating an upper heating-delta limit $\delta_{max}$ and a lower heating-delta limit $\delta_{min}$ for the MR sensor elements as a function of the optical stripe-height measurements $SH_k$ and the heating-delta measurements $\delta_k$, and selecting those MR sensor elements for which the heating-delta $\delta_j$ is within the range ($\delta_{max}$, $\delta_{min}$) for use in making the magnetoresistive (MR) heads.

In another embodiment, this invention is a process for manufacturing read/write heads for direct access storage devices (DASDs) including magnetic gap write elements interleaved with magnetoresistive (MR) sensor read elements each having a read-width $RW_j$ within a first predetermined range ($RW_{max}$, $RW_{min}$) and a stripe-height $SH_j$ within a second predetermined range ($SH_{max}$, $SH_{min}$) including the steps of fabricating a first plurality (I) of MR sensor elements on a substrate optically measuring the read-width $RW_k$ of each of a second plurality (K<I) of the MR sensor elements, where k=1, K, measuring a first heating-delta $\delta_i$ for each of the first plurality (I) of MR sensor elements, calculating a first upper heating-delta limit $\delta_{max}$ and a first lower heating-delta limit $\delta_{min}$ for the MR sensor elements as a function of the optical read-width measurements $RW_k$ and the first heating-delta measurements $\delta_k$, measuring the stripe-height $SH_k$ of each of a second plurality (K<I) of the MR sensor elements, where k=1, K, measuring a second heating-delta $\delta_i$ for each of the first plurality (I) of MR sensor elements, calculating a second upper heating-delta limit $\delta_{max}$ and a second lower heating-delta limit $\delta_{min}$ for the MR elements as a function of the optical stripe-height measurements $SH_k$ and the second heating-delta measurements $\delta_k$, and selecting those MR sensor elements for which the first heating-delta $\delta_j$ is within the first range ($\delta_{max}$, $\delta_{min}$) and the second heating-delta $\delta_j$ is within the second range ($\delta_{max}$, $\delta_{min}$) for use in making the read/write heads.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DETAILED DESCRIPTION OF THE PREFERRED EMBODIMENTS

Figure 1:
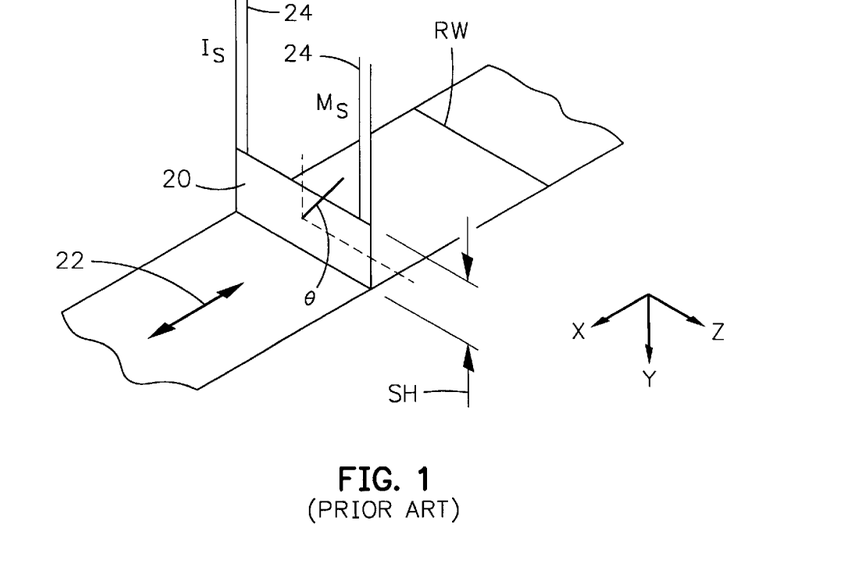
FIG. 1 shows a schematic diagram illustrating the various dimensions and features of the MR stripe used as a read head sensor.

FIG. 1 shows a magnetoresistive (MR) read sensor strip geometry known in the art. In its simplest form, the MR sensor element consists of a narrow stripe 20 of magnetoresistive materials such as NiFe, NiCo or CoFe, of height SH and width RW. The stripe 20 is mounted in a plane perpendicular to the recording medium 22 and connected to the conductors 24 at each end carrying a sense current $I_s$. Because of the magnetoresistive effect, the resistivity of each portion of stripe 20 depends on the angle $\theta$ between the direction of magnetization $N_s$ and the current density vector, as is well-known in the art. In a spin valve sensor, the resistivity varies as a function of the angle between the magnetic moments of the free and pinned layers.

Figure 2:
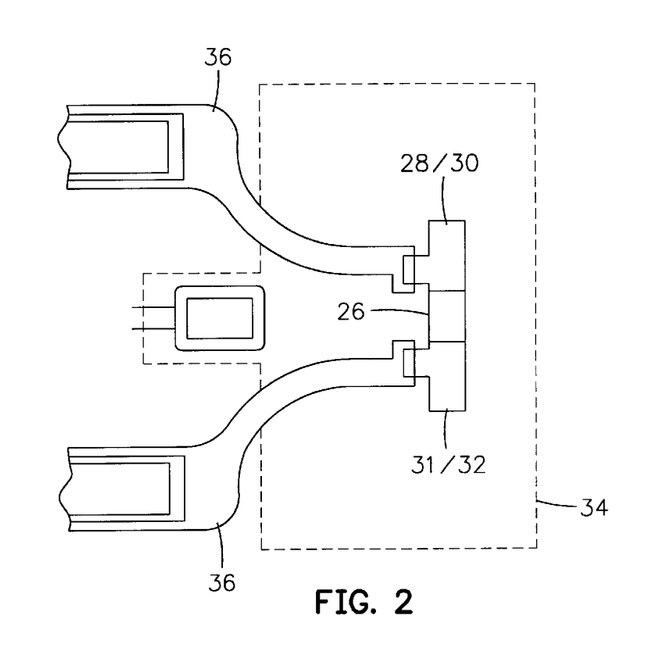
FIG. 2 illustrates a plan view of a typical MR read sensor element known in the art.

Thin film techniques are widely used for fabricating MR sensor elements because of the advantageous effects of very narrow read-with (RW) and stripe height (SH). FIG. 2 shows a top plan view of a MR sensor element 26. MR sensor 26 includes the stripe 20. Referring to FIG. 4, the conductor and hard bias layers 28 and 30 and the conductor and hard bias layers 31 and 32 are coupled to MR sensor element 26 in a spatial relationship that defines the read-width RW. Hard bias layers 30 and 32 are included to stabilize the magnetic domains of MR sensor element 26 in the well-known manner. The read/write head 40 also includes an upper MR shield 34 and a lower MR shield 38 (shown in FIG. 3; only MR shield 34 is shown in FIG. 2 because lower MR shield 38 is directly below). The sensor leads 36 are thin gold conductors for conducting bias current through MR sensor element 26 via conductor layers 28 and 31 and hard bias layers 30 and 32.

Figure 3:
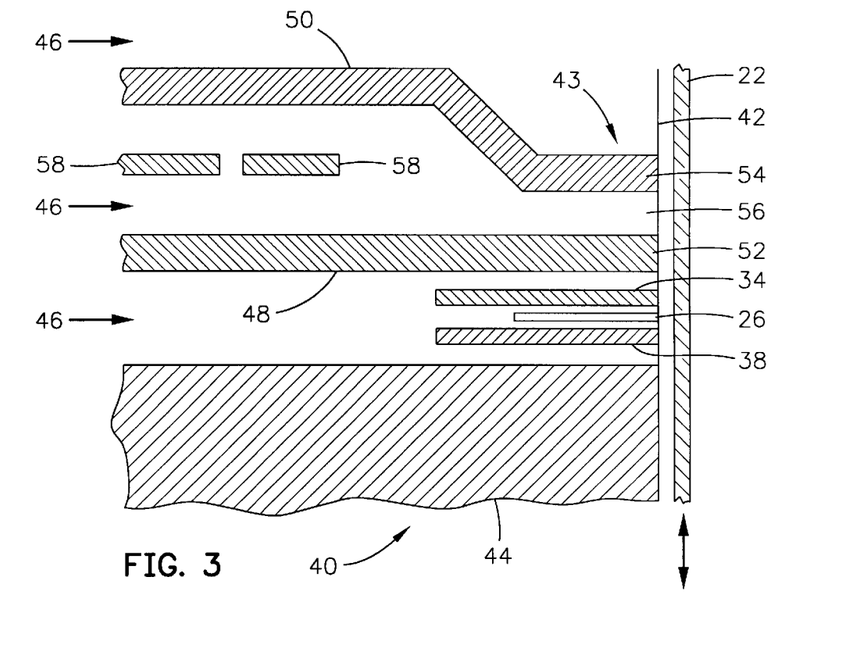
FIG. 3 illustrates the MR read sensor element of FIG. 2 viewed from the side.
Figure 4:
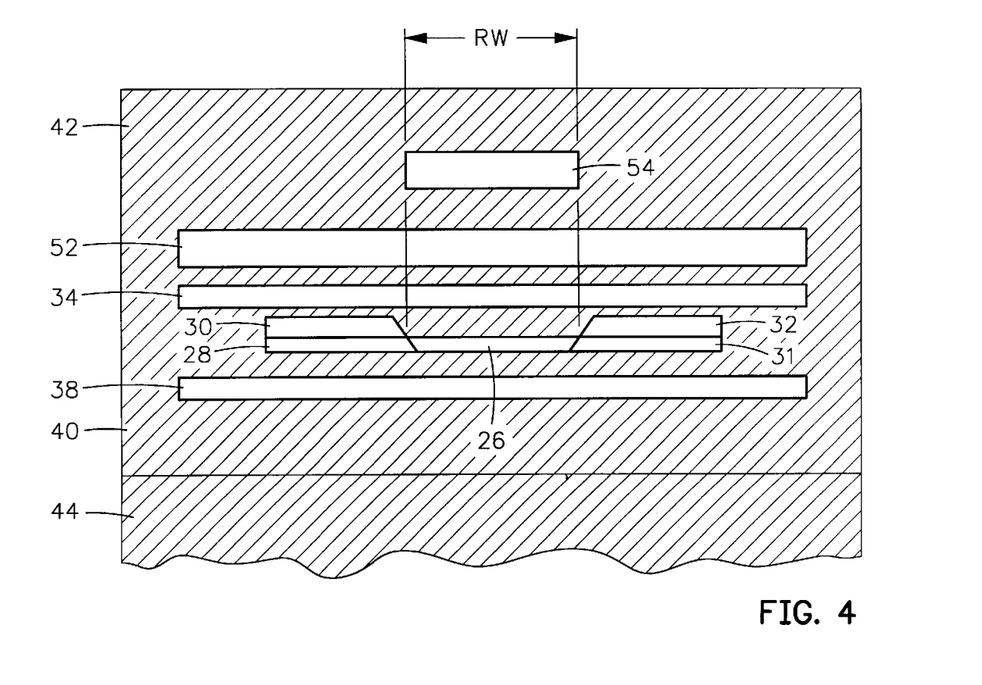
FIG. 4 illustrates the MR read sensor element of FIG. 2 viewed from the front air bearing surface (ABS)

FIG. 3 shows a read/write head assembly 40 viewed from the side. Read/write head 40 includes MR sensor element 26 discussed above in connection with FIG. 2 and a separate inductive write assembly 43 formed adjacent one another on a substrate 44 A portion of the read/write head 40 is shown in transducing relationship with the moving magnetic recording medium 22. The head air bearing surface (ABS) 42 is disposed in facing relationship with and slightly above the recording surface of recording medium 22. Typically, read/write head 40 (FIG. 3) represents a single pair of read and write elements (MR sensor element 26 and inductive write assembly 43). MR sensor element 26 is enclosed by upper MR shield 34 and lower MR shield 38. Sensor leads 36 (shown in FIG. 2) couple MR sensor element 26 to external circuitry (not shown) to provide for sensing the resistance of MR sensor element 26 as changed by external magnetic fields.

The MR read assembly is formed by vacuum deposition techniques, such as sputter deposition, for example, on the substrate 44. The various elements of the MR assembly discussed above are surrounded and insulated from one another with layers, exemplified by the layer 46, of insulating material, such as silicon dioxide or aluminum oxide, for example.

The inductive write assembly includes a lower or first pole piece 48 and an upper or second pole piece 50. Pole pieces 48 and 50 are made of a highly permeable magnetic material such NiFe, for example, and form a magnetic circuit that is magnetically closed at a back gap portion (not shown) with the first and second pole tips 52 and 54 forming a magnetic gap 56 at the air bearing surface 42, thereby acting as a magnetic gap write element. One or more write coils are disposed between first and second pole pieces 48 and 50. Write coil 58 is also connected to external circuitry (not shown) via conductive leads (not shown). Pole pieces 48 and 50 and write coil 58 are usually fabricated by well-known processes such as electroplating or sputter deposition, for example. Pole pieces 48 and 50 are insulated electrically from write coil 58 and the MR read assembly by layers, exemplified by layer 46, of insulating and protective material. Read/write head 40 is sometimes denominated a "piggyback" head assembly. In an alternative embodiment, sometimes denominated a "merged" head assembly, first pole piece 48 also serves as a second shield layer for the read assembly, in which case layer 34 is omitted. Either configuration can be repeated to define a "interleaved" read/write head consisting of alternating read and write elements substantially as shown.

FIG. 4 illustrates the typical read/write head assembly 40 from FIG. 3 viewed from the front air bearing surface 42

(FIG. 3). FIG. 4 may be appreciated with reference to the above description of read/write head assembly 40 shown in FIG. 3. Note that the read-width (RW) of MR sensor element 26 is roughly equivalent to the height of second pole tip 54, which together govern the requisite track width for the recording medium.

Figure 6:
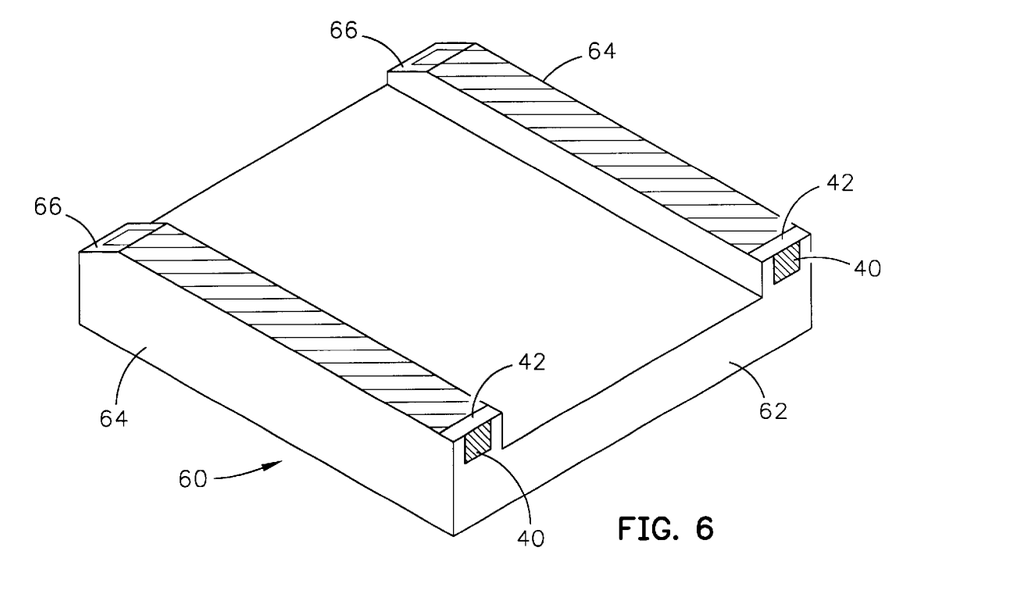
FIG. 6 shows an illustrative embodiment of a read/write head and slider assembly suitable for use in a hard disk drive.

FIG. 6 shows an illustrative embodiment, in perspective, of a typical slider 60 having read/write heads 40 formed on the slider trailing edge 62. Slider 60 is suitable for use in a direct access storage device (DASD) using hard disk drives. Slider 60 has a rectangular rail 64 along each of the slider edges aligned parallel to the longitudinal axis of the slider. The top surface of each rail 64 forms the slider air bearing surface. The leading edge of each rail 64 has an upward-sloping ramp 66 formed across the entire width of rail 64. Read/write head assembly 40 is mounted on or formed integrally with slider trailing edge 62 and has the read and write head elements exposed at air bearing surface 42 as detailed in FIGS. 3 and 4.

FIG. 5 illustrates a single wafer substrate showing a plurality of interleaved read and write head elements 70 fabricated thereon. The substrate wafer 68 is processed using thin film deposition technology to produce an array of read/write head elements 70, each of which include at least one MR sensor element such as MR sensor element 26 shown in FIG. 2. During quality control (QC) testing of read/write head assemblies 70 shown on wafer substrate 68 in FIG. 5, it is possible to manually measure the read-width (RW) of a few particular MR sensor element 26 (FIG. 2) by using electron microscopy. However, it is much more practical to automatically measure the electrical resistance of all MR element 26 by probing the appropriate pairs of sensor leads 36 (FIG. 2) using computer-controlled robotic equipment. The method of this invention, as discussed below in connection with FIG. 10, uses both of these steps to screen every read/write head 70 on substrate 68 for acceptable read-width (RW) values.

The method of this invention arises from the unexpectedly advantageous observation that the read-width RW and the stripe-height SH for MR sensor element 26 are each related by one of two substrate coefficients to a heating-delta, $\delta=(RH-RC)/RC$, for MR sensor element 26. A heating-delta for MR sensor element 26 can be measured without referring to the actual element temperature, as may be understood with reference to the following discussion.

For purposes of the method of this invention, a three-step process for measuring both heating deltas is preferred. The cold resistance RC is measured by applying a fixed bias current (for example, 1 mA) through the MR sensor element under test and (within a few milliseconds) measuring the voltage drop. The hot resistance RH is measured twice; once at constant-voltage for the RW determination and once again at constant-current for the SH determination. The constant-voltage measurement of RH is made by applying a fixed voltage (for instance, 200 mV) to the MR element under test and (within a few milliseconds) measuring the current. The constant-current measurement of RH is made by applying a fixed current (for instance, 4 mA) to the MR element under test and (within a few milliseconds) measuring the current. For each of the two RH measurements, the heating-delta $\delta=(RH-RC)/RC$ may be readily and automatically computed. If the read-width RW alone is to be tested, the second constant-current RH measurement may be omitted.

Figure 7:
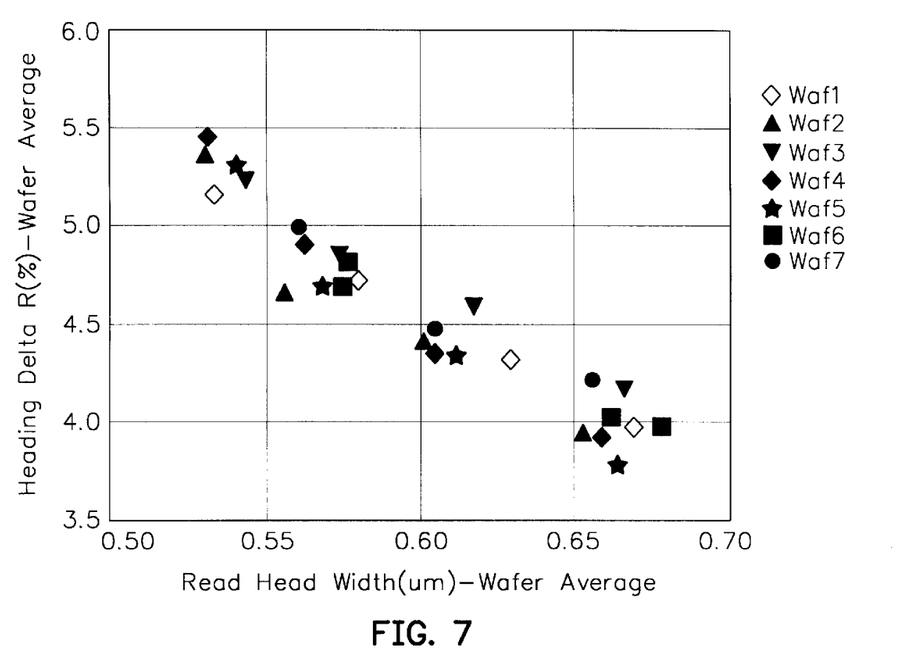
FIG. 7 shows an experimentally-measured 1 relationship between read-width (RW) and heating-delta for MR read sensor elements as determined for the first time by the inventors.

The inventors have found experimentally that, for a particular wafer substrate, the RW for any MR sensor element under test is related to the constant-voltage heating-delta for the same MR element. This experimental result is best appreciated with reference to FIG. 7, which provides the relationship between heating-delta $\delta$ and read-width RW for seven different wafer substrates. The RW values are seen to vary from about 530 nm to 680 nm, which variation is seen to be related more or less predictably to the variation of heating-delta values from about 5.5% to 3.8%, respectively. The precise relationship exemplified in FIG. 7 may be determined on a wafer-by-wafer basis by optically measuring the read-width RW of a few (for example, 200) MR sensor elements with an electron microscope and correlating the optical RW measurements with the automated constant-voltage heating-delta measurements for the same few MR sensor elements. For each of these measurements (k=1, K where K is about 200), a test coefficient $CT_k=RW_k^2/\delta_k$ is computed. The K values of $CT_k$ are then combined to produce a substrate coefficient CS representing the relationship shown in FIG. 7. Once the substrate coefficient (CS= $RW^2/\delta$) is established by combining the optical RW measurements for the MR sensor element sample, then the read-width RW can easily be estimated for every other MR sensor element from the constant-voltage RH and constant-current RC measurements needed to calculate the RW-related heating-deltas for each of the MR sensor elements.

Figure 8:
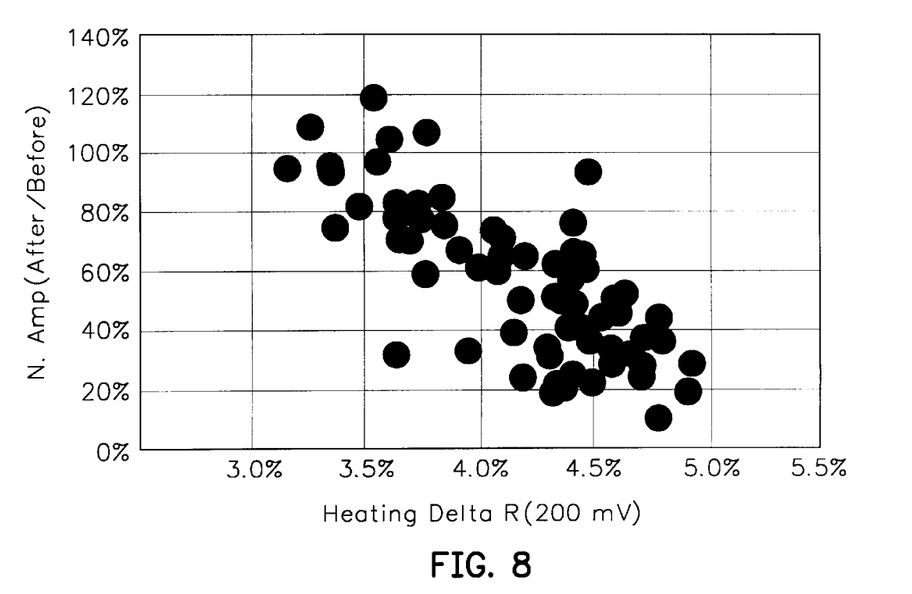
FIG. 8 shows an experimentally-measured relationship between heating-delta and a time rate of change of voltage-drop at fixed current for MR read sensor elements as determined for the first time by the inventors.

FIG. 8 illustrates the experimental results of tests made by the inventors to demonstrate the relationship between the heating-delta and bias current ratio (before and after heating) for a constant 200 mV bias voltage applied for 10 seconds. The clustering of experimental results in FIG. 8 demonstrates that there is a strong correlation between read-width RW and heating-delta $\delta$ for any particular substrate wafer.

Figure 9:
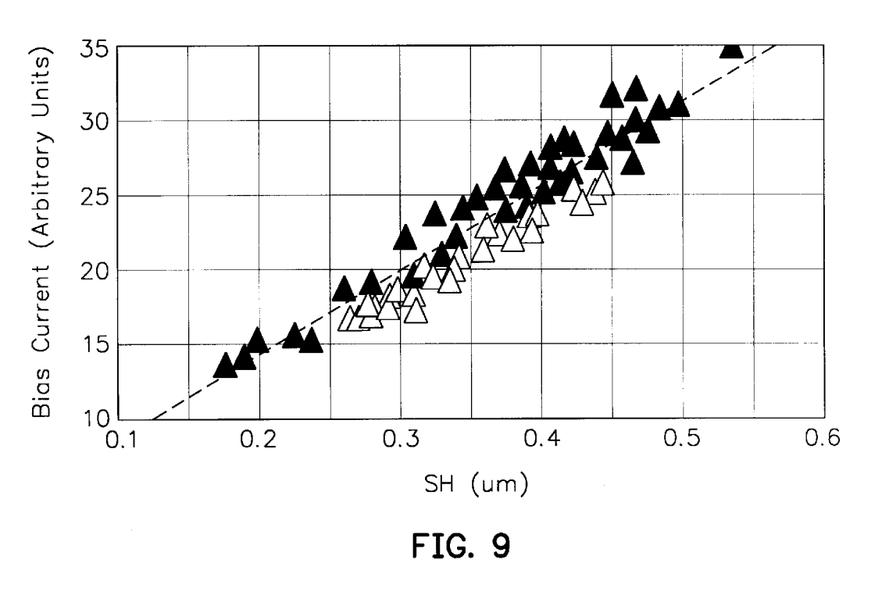
FIG. 9 shows an experimentally-measured relationship between stripe height (SH) and bias current for MR read sensor elements as determined by the inventors.

FIG. 9 illustrates the experimental results of tests made by the inventors to demonstrate the relationship between the stripe height (SH) and constant-current heating-delta $\delta$ for four different wafer substrates. The SH values are seen to vary from about 150 nm to 550 nm, which variation is seen to be related more or less predictably to the variation in bias current in arbitrary units. The precise relationship exemplified in FIG. 9 may be determined on a wafer-by-wafer basis by optically measuring the stripe-height SH of a few (for example, 200) MR sensor elements with an electron microscope and correlating the optical SH measurements with the automated constant-current heating-delta measurements for the same few MR sensor elements. For each of these measurements (k=1, K where K is about 200), a test coefficient $CT_k=RW_k^2/\delta_k$ is computed. The K values of $CT_k$ are then combined to produce a substrate coefficient CS representing the relationship shown in FIG. 7. Once the substrate coefficient (CS=$RW^2/\delta$) is established by combining the optical SH measurements for the MR sensor element sample, then the stripe-height SH can easily be estimated for every other MR sensor element from the constant-current RH and RC measurements needed to calculate the SH-related heating-deltas for each of the MR sensor elements.

Figure 10A:
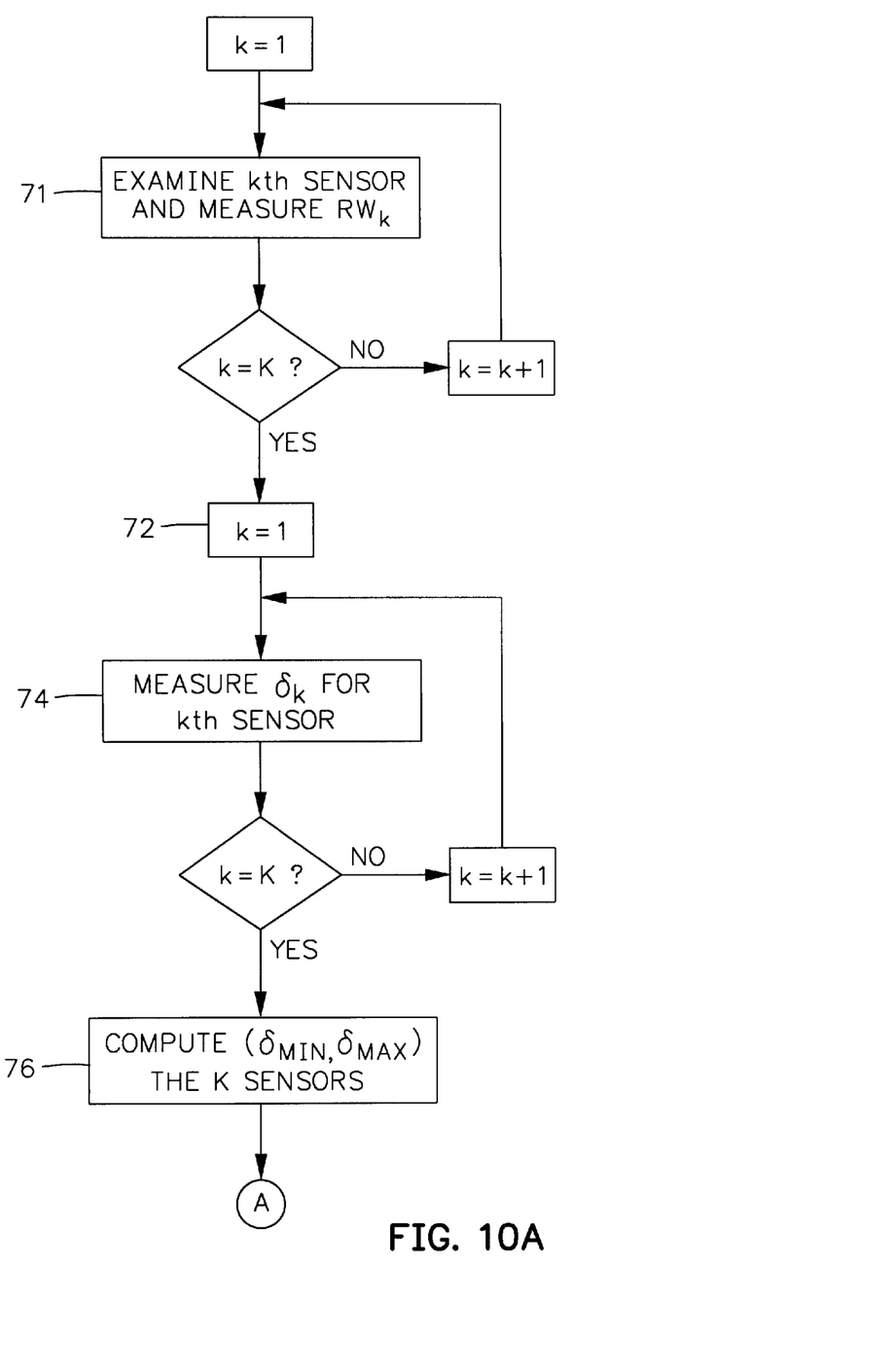
FIGS. 10A and 10B illustrate a flow chart diagram of the method of this invention.
Figure 10B:
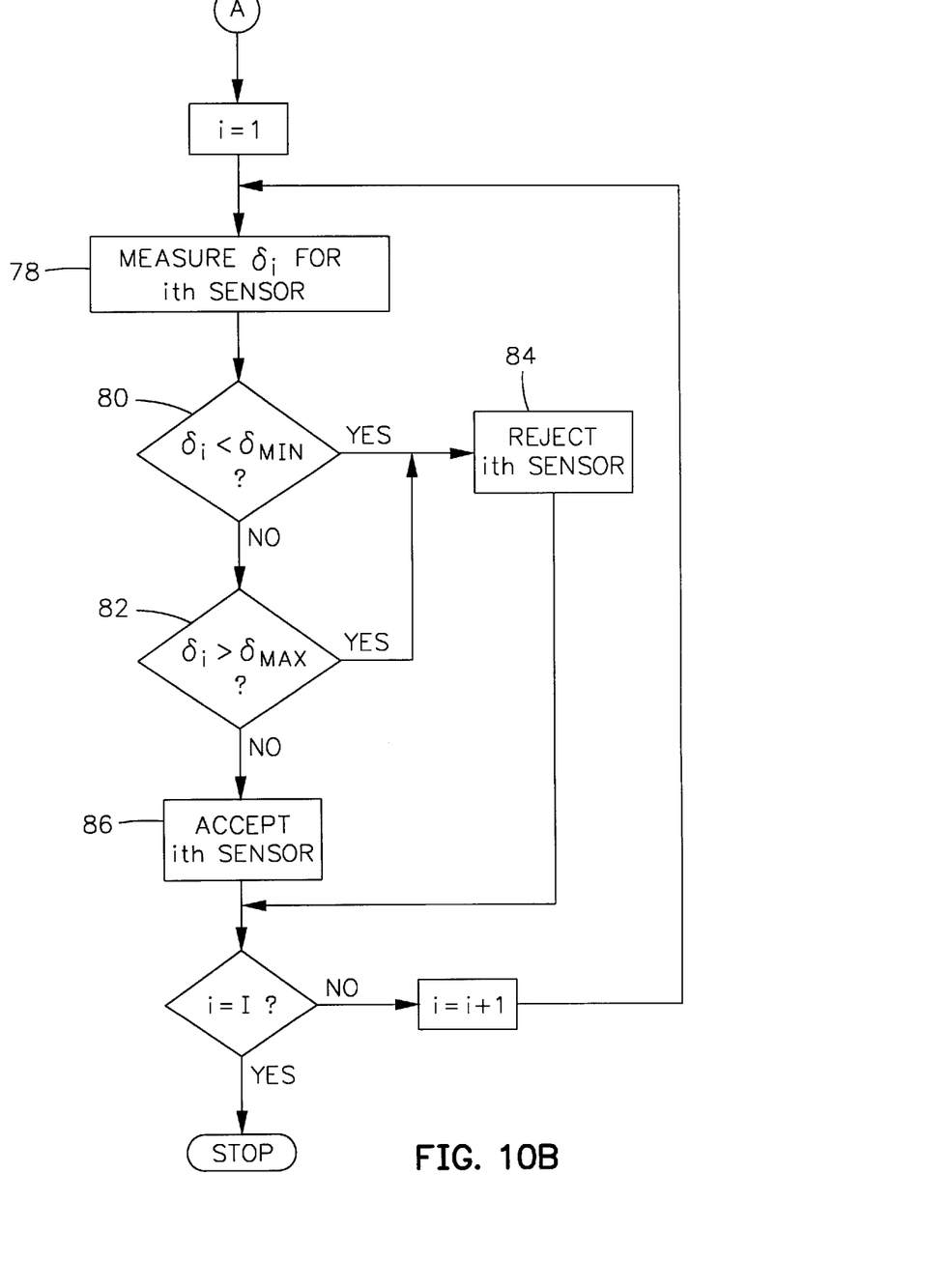

FIG. 10 provides a block diagram showing an illustrative embodiment of the method of this invention for screening read-width values. For the purpose of appreciating FIG. 10, it is assumed that a plurality, I, of MR sensor elements are fabricated on a single wafer substrate (for example, wafer substrate 68 in FIG. 6). For example, this plurality I may be 14,000 or so. In the method of this invention, a small sample of these MR sensor elements (a plurality, K) are selected for examination with an electron microscope. For example, this plurality K may be 10 or so. For each of the K sensor elements, the examination step 71 is performed, which provides a measured read-width value $RW_k$ for the $k^{th}$ MR sensor element. Step 71 is repeated for every interger k=1, K as may be understood with reference to FIG. 10. After completing step 71 for the $K^{th}$ MR sensor element, the process then proceeds to the step 72 where the index k is reset to unity and, in the step 74, the heating-delta $\delta=(R_H-R_C)/R_C$ is computed for each of the MR sensor elements in a loop for every integer k=1, K. After step 74 is completed for the $K^{th}$ sensor element, the substrate coefficient $CS_K$ is calculated. Substrate coefficient $CS_K$ represents an expected value computed from the small sample (K in number) of test coefficients $CT_k$ that were individually derived from the optically-measured read-widths $RW_k$ and automatically-measured deltas $\delta_k$ for the MR sensor element sample. For example, these measurements may be made on 200 such MR sensor elements on a single wafer substrate and an expected value for the substrate coefficient CS may be computed by using the mean value of the test coefficients.

Using the substrate coefficient expected value, $CS_K$, an acceptable range of heating-deltas from $\delta_{max}=CS_K/(RW_{min})^2$ to $\delta_{min}=CS_K/(RW_{max})^2$ is computed in the step 76. It may be readily appreciated that the heating-delta range computed in step 76 is a result of the measurements of the K sensor element sample alone. The reasoning behind the form of the computation is discussed below. After completing step 76, each of the plurality I MR sensor elements in the substrate wafer are inspected for acceptance or rejection. Although the acceptance criterion for the $i^{th}$ MR sensor element is the read-width, $(RW_{min}<RW_i<RW_{max})$, the inspection is performed by measuring the heating-delta $\delta_i$ for the $i^{th}$ MR sensor element and therefrom inferrimg the acceptance/rejection of the $RW_1$ for the $i^{th}$ MR sensor element. This measurement is accomplished in the step 78 of FIG. 10 for the $i^{th}$ MR sensor element. At the steps 80 and 82, the measured heating-delta $\delta_i$ is tested $(\delta_{MIN}<\delta_i<\delta_{MAX})$ against the acceptable range of values determined in step 76 above. If the measured heating-delta $\delta_i$ falls outside the acceptable heating-delta range $(\delta_{MIN}, \delta_{MAX})$, then the $i^{th}$ MR sensor element is rejected at the step 84. Otherwise, the $i^{th}$ sensor element is accepted at the step 86. Following the acceptance/rejection decisions, the index i is tested and incremented and the procedure repeated for the remaining MR sensor elements on the wafer substrate.

As discussed above in connection with FIGS. 7–9, the inventors have determined through experimental measurement that the method of this invention provides a reliable QC screening technique for MR head elements of the type discussed hereinabove. The inventors also have developed a theoretical explanation for the usefulness of the relationship between read-width RW, stripe-height SH and the two heating-deltas $\delta$. Eqn. 1 describes the definition of the heating-delta in terms of resistance values measured at two different temperatures RH and RC:

$$\delta=(RH-RC)/RC \qquad \text{[Eqn. 1]}$$

For read-width RW determination, a constant-voltage RH (hot resistance) is measured by applying a 200 mV voltage across the MR sensor element. The RC (cold resistance) is measured separately by passing a fixed current of 1 mA through the MR sensor element. Because the MR sensor element resistances are typically in the region of 40 ohms, the RH measurement is made at approximately 5 mA, which provides substantially more heating energy to the MR sensor element than does the 1 mA, thereby providing a "hot" resistance measurement.

Considering that the heating of the MR sensor element, $\Delta T$, is equal to the heating power multiplied by the thermal impedance, it follows that:

$$\delta(1+\delta) = \frac{V^2}{\rho \times RW^2} \cdot \frac{TCR \times \tau_1 \times \tau_2}{(\tau_1 + \tau_2) \times C_T} \qquad \text{[Eqn. 2]}$$

where: $\delta$=heating delta from Eqn. 1,

V=bias voltage, $\rho$=substrate sheet resistivity in ohms/square,

RW=sensor read-width in metric units,

TCR=temperature coefficient of resistance for substrate in $(C°)^{-1}$, $\tau_1, \tau_2$=thermal propagation coefficients of the surrounding substrate, and $C_T$=thermal conduction constant (not to be confused with test coefficient CT).

The thermal propagation coefficients $\tau_1, \tau_2$ are related directly to the length of the gap between upper or lower shield 34, 38 and MR sensor 26 as seen in FIG. 3. Coefficients $\tau_1, \tau_2$ are also related to the relative thermal conductivity between both shields 34, 38 and the gap materials.

Considering that $\tau<<1$ (for example, 3%), then the approximation can be made as shown in Eqn. 3:

$$\delta(1+\delta) \approx \delta \qquad \text{[Eqn. 3]}$$

Eqn. 3 demonstrates that, for the same substrate conditions and head geometry, the heating-delta can be used to compute the read-width by using the approximately-invariant substrate coefficient CS defined as follows:

$$CS \cong \frac{V^2}{\rho} \cdot \frac{TCR \times \tau_1 \times \tau_2}{(\tau_1 + \tau_2) \times C_T} \qquad \text{[Eqn. 4]}$$

Note that the right-hand side of Eqn. 4 is constant (for the same substrate) if the bias voltage V is constant. For this reason, the constant-voltage RH measurement is used to derive the heating delta $\delta$ (per Eqn. 1) used to determine read-width RW from the substrate coefficient CS of Eqn. 4.

For stripe-height SH determination, a constant-current RH (hot resistance) is measured by applying a 4 mA current through the MR sensor element. As was done for read-width RW determination, the RC (cold resistance) is measured separately by passing a fixed current of 1 mA through the MR sensor element. The RH measurement is made with 16 times more heating energy to the MR sensor element than RC measurement, thereby providing a "hot" resistance measurement.

The inventors have shown that the heating-delta is related to the stripe height SH according to the Eqn. 5:

$$\frac{\delta}{1+\delta} = \frac{I^2 \times \rho}{SH^2} \cdot \frac{TCR \times \tau_1 \times \tau_2}{(\tau_1 + \tau_2) \times C_T} \qquad \text{[Eqn. 5]}$$

Again, because $\delta<<1$, Eqn. 5 can be approximated by following equation:

$$\delta \approx \frac{CS}{SH^2} \qquad \text{[Eqn. 6]}$$

where $$CS = I^2 \times \rho \cdot \frac{TCR \times \tau_1 \times \tau_2}{(\tau_1 + \tau_2) \times C_T} \quad [\text{Eqn. 7}]$$

Note that the right-hand side of Eqn. 7 is constant (for the same substrate) if the bias current I is constant. For this reason, the constant-current RH measurement is used to derive the heating delta δ (per Eqn. 1) used to determine stripe-height SH from the substrate coefficient CS of Eqn. 6.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for determining the read-width $RW_i$ of one of a first plurality (I) of magnetoresistive (MR) sensor elements fabricated on a substrate, the method comprising the steps of:

optically measuring the read-width $RW_k$ of each of a second plurality (K<I) of the MR sensor elements, where i≠k=1, K;

measuring a heating-delta $\delta_i$ for the one MR sensor element and a heating-delta $\delta_k$ for each of the second plurality (K<I) of MR sensor elements; and calculating the read-width $RW_i$ of the one MR sensor element as a function of the optical read-width measurements $RW_k$ and the heating-delta measurements $\delta_i$ and $\delta_k$.

2. The method of claim 1 further comprising the step of: calculating an expected value of a substrate coefficient $CS_K$ as a function of the optical read-width measurements $RW_k$ and the heating-delta measurements $\delta_k$.

3. The method of claim 2 further comprising the steps of: calculating a test coefficient $CT_k=(RW_k)^2/\delta_k$ for each of the second plurality (K<I) of MR sensor elements; and combining the second plurality of test coefficients $CT_k$ to obtain the expected value of the substrate coefficient $CS_K$.

4. The method of claim 3 further comprising the steps of: measuring a cold resistance $RC_i$ when a fixed current is applied to the $i^{th}$ MR sensor element;

measuring a hot resistance $RH_i$ when a fixed voltage is applied to the $i^{th}$ MR sensor element; and computing the heating-delta $\delta_i=(RH_i-RC_i)/RC_i$ for the $i^{th}$ MR sensor element.

5. The method of claim 4 further comprising the step of: calculating the read-width $RW_i=(\delta_i \cdot CS_K)^{1/2}$ for the one MR sensor element.

6. A method for determining the stripe-height $SH_i$ of one of a first plurality (I) of magnetoresistive (MR) sensor elements fabricated on a substrate, the method comprising the steps of:

optically measuring the stripe-height $SH_k$ of each of a second plurality (K<I) of the MR sensor elements, where i≠k=1, K;

measuring a heating-delta $\delta_i$ for the one MR sensor element and a heating-delta $\delta_k$ for each of the second plurality (K<I) of MR sensor elements; and calculating the stripe-height $SH_i$ of the one MR sensor element as a function of the optical stripe-height measurements $SH_k$ and the heating-delta measurements $\delta_i$ and 7. The method of claim 6 further comprising the step of: calculating an expected value of a substrate coefficient $CS_K$ as a function of the optical stripe-height measurements $SH_k$ and the heating-delta measurements $\delta_k$.

8. The method of claim 7 further comprising the steps of: measuring a cold resistance $RC_i$ when a first fixed current is applied to the $i^{th}$ MR sensor element;

measuring a hot resistance $RH_i$ when a second fixed current is applied to the $i^{th}$ MR sensor element; and computing the heating-delta $\delta_i=(RH_i-RC_1)/RC_i$ for the $i^{th}$ MR sensor element.

9. A process for manufacturing magnetoresistive (MR) heads having a read-width $RW_j$ within a predetermined range ($RW_{max}$, $RW_{min}$) comprising the step of:

fabricating a first plurality (I) of magnetoresistive (MR) sensor elements on a substrate;

optically measuring the read-width $RW_k$ of each of a second plurality (K<I) of the MR sensor elements, where k=1, K;

measuring a heating-delta $\delta_i$ for each of the first plurality (I) of MR sensor elements;

calculating an upper heating-delta limit $\delta_{max}$ and a lower heating-delta limit $\delta_{min}$ for the MR sensor elements as a function of the optical read-width measurements $RW_k$ and the heating-delta measurements $\delta_k$; and selecting those MR sensor elements for which the heating-delta $\delta_j$ is within the range ($\delta_{max}$, $\delta_{min}$) for use in making the magnetoresistive (MR) heads.

10. The process of claim 9 further comprising the step of: calculating an expected value of a substrate coefficient $CS_K$ as a function of the optical read-width measurements $RW_k$ and the heating-delta measurements $\delta_k$.

11. The process of claim 10 further comprising the steps of:

calculating a test coefficient $CT_k=(RW_k)^2/\delta_k$ for each of the second plurality (K<I) of MR sensor elements; and combining the second plurality of test coefficients $CT_k$ to obtain the expected value of the substrate coefficient $CS_K$.

12. The process of claim 11 further comprising the steps of:

measuring a cold resistance $RC_i$ when a fixed current is applied to the $i^{th}$ MR sensor element;

measuring a hot resistance $RH_i$ when a fixed voltage is applied to the $i^{th}$ MR sensor element; and computing the heating-delta $\delta=(RH_i-RC_i)/RC_i$ for the $i^{th}$ MR sensor element.

13. The process of claim 12 further comprising the step of: calculating the read-width $RW_i=(\delta_i \cdot CS_K)^{1/2}$ for each of the first plurality (I) of MR sensor elements.

14. A process for manufacturing magnetoresistive (MR) heads having a stripe-height $SH_j$ within a predetermined range ($SH_{max}$, $SH_{min}$) comprising the steps of:

fabricating a first plurality (I) of magnetoresistive (MR) sensor elements on a substrate;

optically measuring the stripe-height $SH_k$ of each of a second plurality (K<I) of the MR sensor elements, where k=1, K;

measuring a heating-delta $\delta_i$ for each of the first plurality (I) of MR sensor elements;

calculating an upper heating-delta limit $\delta_{max}$ and a lower heating-delta limit $\delta_{min}$ for the MR sensor elements as a function of the optical stripe-height measurements $SH_k$ and the heating-delta measurements $\delta_k$; and selecting those MR sensor elements for which the heating-delta $\delta_j$ is within the range ($\delta_{max}$, $\delta_{min}$) for use in making the magnetoresistive (MR) heads.

15. The process of claim 14 further comprising the step of:

calculating an expected value of a substrate coefficient $CS_K$ as a function of the optical stripe-height measurements $SH_k$ and the heating-delta measurements $\delta_k$.

16. The process of claim 15 further comprising the steps of:

calculating a test coefficient $CT_k=(RW_k)^2/\delta_k$ for each of the second plurality (K<I) of MR sensor elements; and combining the second plurality of test coefficients $CT_k$ to obtain the expected value of the substrate coefficient $CS_K$.

17. The process of claim 16 further comprising the steps of:

measuring a cold resistance $RC_i$ when a first fixed current is applied to the $i^{th}$ MR sensor element;

measuring a hot resistance $RH_i$ when a second fixed current is applied to the $i^{th}$ MR sensor element; and computing the heating-delta $\delta_i=(RH_i-RC_i)/RC_i$ for the $i^{th}$ MR sensor element.

18. The process of claim 17 further comprising the step of:

calculating the stripe-height $SH_i=(\delta_i \cdot CS_K)^{1/2}$ for each of the first plurality (I) of MR sensor elements.

19. A process for manufacturing read/write heads for direct access storage devices (DASDs) including magnetic gap write elements interleaved with magnetoresistive (MR) sensor read elements each having a read-width $RW_j$ within a first predetermined range ($RW_{max}$, $RW_{min}$) and a stripe-height $SH_j$ within a second predetermined range ($SH_{max}$, $SH_{min}$), the method comprising the steps of:

fabricating a first plurality (I) of MR sensor elements on a substrate;

optically measuring the read-width $RW_k$ of each of a second plurality (K<I) of the MR sensor elements, where k=1, K;

measuring a first heating-delta $\delta_i$ for each of the first plurality (I) of MR sensor elements;

calculating a first upper heating-delta limit $\delta_{max}$ and a first lower heating-delta limit $\delta_{min}$ for the MR sensor elements as a function of the optical read-width measurements $RW_k$ and the first heating-delta measurements $\delta_k$; and selecting those MR sensor elements for which the first heating-delta $\delta_j$ is within the first range ($\delta_{max}$, $\delta_{min}$) for use in making the read/write heads.

20. The process of claim 19 further comprising the step of:

calculating an expected value of a first substrate coefficient $CS_K$ as a function of the optical read-width measurements $RW_k$ and the first heating-delta measurements $\delta_k$.

21. The process of claim 20 further comprising the steps of:

measuring a cold resistance $RC_i$ when a fixed current is applied to the $i^{th}$ MR sensor element;

measuring a hot resistance $RH_i$ when a fixed voltage is applied to the $i^{th}$ MR sensor element; and computing the first heating-delta $\delta_i=(RH_i-RC_i)/RC_i$ for the $i^{th}$ MR sensor element.

22. The process of claim 21 further comprising the steps of:

measuring the stripe-height $SH_k$ of each of a second plurality (K<I) of the MR sensor elements, where k=1, K;

measuring a second heating-delta $\delta_i$ for each of the first plurality (I) of MR sensor elements;

calculating a second upper heating-delta limit $\delta_{max}$ and a second lower heating-delta limit $\delta_{min}$ for the MR elements as measurements $SH_k$ and the second heating-delta measurements $\delta_k$; and selecting those MR sensor elements for which the second heating-delta $\delta_j$ is within the second range ($\delta_{max}$, $\delta_{min}$) for use in making the read/write heads.

23. The process of claim 22 further comprising the step of:

calculating an expected value of a second substrate coefficient $CS_K$ as a function of the optical stripe-height measurements $SH_k$ and the second heating-delta measurements $\delta_k$.

24. The process of claim 23 further comprising the steps of:

measuring a second hot resistance $RH2_i$ when a second fixed current is applied to the $i^{th}$ MR sensor element; and computing the second heating-delta $\delta_i=(RH2_i-RC_i)/RC_i$ for the $i^{th}$ MR sensor element.

* * * * *